Dec. 18, 1962   M. W. CARLSON   3,068,697
LEVEL GAGES

Filed Sept. 26, 1960   2 Sheets-Sheet 1

INVENTOR.
MORRIS W. CARLSON
BY
Grover G. Frater
ATTORNEY

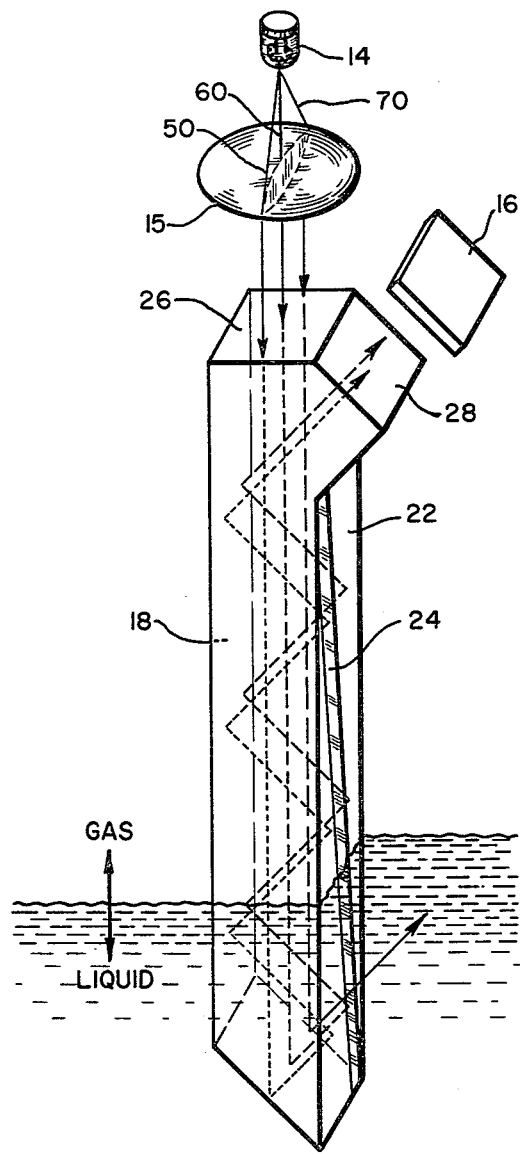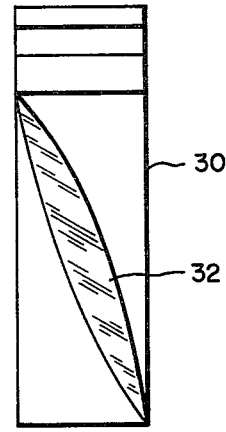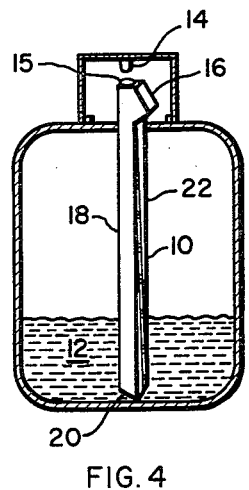

3,068,697
LEVEL GAGES
Morris William Carlson, Davenport, Iowa, assignor to The Bendix Corporation, a corporation of Delaware
Filed Sept. 26, 1960, Ser. No. 58,268
4 Claims. (Cl. 73—293)

This invention relates to liquid level gages and in particular to gages for measuring any level within a selected range.

Objects of the invention are to provide a continuous level gage which has no moving parts, can be constructed easily in rugged form, is not affected by variations in dielectric constant of the liquid being gaged, has very rapid response to level change, and can be used to gage the level of liquids over a wide range of temperatures including those, such as liquid hydrogen, whose temperature approaches absolute zero.

Another object is to provide a gage which can be produced in a wide variety of specific forms suited to various container shapes and orientations and commensurate with a wide range of size, placement, and arrangement problems which limit provision of mounting and access openings in containers.

Other objects and advantages of the invention will hereinafter appear in the description of the invention and certain embodiments, it being understood that various modifications may be made in the embodiments shown and that other embodiments are possible without departing from the spirit of the invention and the appended claims.

In the drawing:

FIG. 4 is a schematic illustration of one embodiment of the invention;

FIG. 5 is a schematic illustration of the sensing device shown in FIG. 4 including diagrammatic representations of light paths; and FIG. 6 is a schematic of a modified form of the sensing device shown in FIGS. 4 and 5.

In the invention, light rays are transmitted through a light conducting element which projects into the body of a liquid whose level is to be gaged. Means are provided for directing the light at a wall area of the element, which extends over the range of levels to be gaged, such that the light will escape from that portion of the area which is immersed in the liquid and such that light does not escape from areas not immersed in the liquid. Means are also provided for measuring the intensity of the light which has impinged on said area without escaping. The intensity of that light changes with liquid level and so is indicative of the level.

It is necessary, to understand the invention, to understand the phenomena reflection and refraction.

It is a well known physical law that the sine of the angle of refraction of light passing through the interface between two media equals the sine of the angle of incidence of the light multiplied by the light's velocity in the medium in which it arrives at the interface and divided by the light's velocity in the medium in which it leaves the interface. The angles of refraction and incidence are measured from a perpendicular to the interface.

$$\text{Sin } R = \frac{V-\text{arriving}}{V-\text{leaving}} \text{ Sin } I \qquad (1)$$

The law is often expressed in terms of indices of refraction. The index of refraction of a medium is defined as the velocity of light in a vacuum divided by the velocity of light in the medium. If the index of refraction is represented by the symbol K, Equation 1 becomes:

$$\text{Sin } R = \frac{K-\text{arriving}}{K-\text{leaving}} \text{ Sin } I \qquad (2)$$

Figure 1:
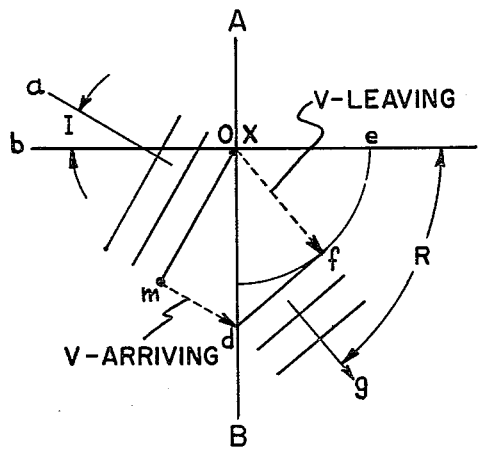
FIG. 1 is a diagram illustrating the law of light refraction.

The law is illustrated in FIG. 1 wherein a series of plane wave-fronts of light are shown arriving at, and leaving, an interface A—B containing a point X. The wave-fronts approach the interface on a line $a$ at an angle of incidence I measured between line $a$ and the perpendicular $b$. At the instant shown, a wave-front containing light units $o$ and $m$ is passing through point $x$ with unit $o$ lying on point $x$. Continuing, unit $m$ will arrive at point $d$ on the interface A—B.

The line $md$ has the direction of movement of unit $m$. For convenience, let its length represent the velocity V-arriving of unit $m$. let it be assumed that the velocity V-leaving of light in the medium to the right of interface A—B is one and one-half times its velocity V-arriving in the medium at the left. The motion of unit $o$, during the period when unit $m$ traverses line $md$ to point $d$, can be described by a vector one and one-half times the length of line $md$ which begins at point $x$ and ends on the arc $e$ whose radius is one and one-half the length of $md$.

At the end of that period, the wave-front containing $o$ and $m$ will extend through $d$ and will be tangent to arc $e$. Unit $o$ will lie on arc $e$ at the point of tangency $f$ and the wave will move in the direction of line $g$ at the refraction angle R.

Inspection of Equations 1 and 2 above will show that it is physically possible for the magnitude of the right side of the equation to exceed one. In this event, however, the equation is not valid because its left side (sine of an angle) cannot exceed one. The physical significance of this fact is that refraction is impossible when the value of the right side of the equation exceeds one. In this circumstance the wave must be entirely reflected.

It will be apparent that there will always be refraction if the velocity of light through the medium at which it arrives at the interface exceeds the velocity of light in the medium in which it leaves the interface.

On the other hand if, in FIG. 1, the velocity V-leaving is increased whereby arc $e$ passes through point $d$, no light will be refracted. Instead, all the light arriving at the interface will travel downwardly along the interface. The angle I shown would be the critical angle for this modified ratio of "arriving" and "leaving" light velocities.

If the angle of incidence is increased without change in these velocities, the situation can be represented by moving point $d$ upwardly toward point $x$ so that the length of the V-arriving vector remains unchanged. In this case the radius of arc $e$ is greater than the distance $xd$ whereby it is impossible to draw a tangent to the arc which will extend through point $d$. This means that the right side of Equation 1 has a magnitude exceeding one and that all of the light will be reflected from the interface.

Suppose, for example, that the light conducting member or level gage is composed of common acrylic plastic and that it is required to determine the level of a body of liquid oxygen covered by gaseous oxygen. The velocity of light in the liquid oxygen is substantially 0.82 time its velocity in the gas and its velocity in the plastic is substantially 0.68 time its velocity in the gas. The solution is diagrammed in FIG. 2.

Figure 2:
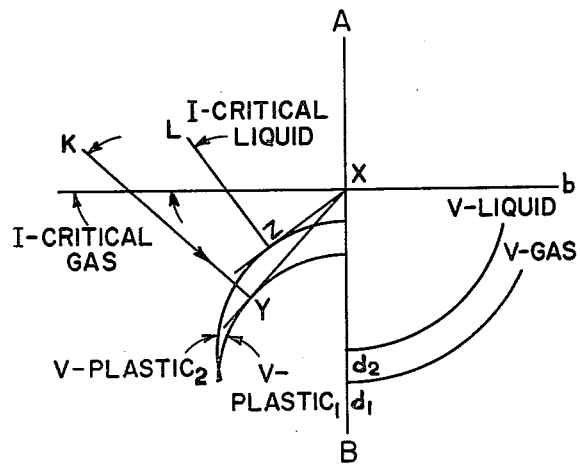
FIG. 2 is a diagram illustrating application of the law of refraction to the invention.

FIG. 2, like FIG. 1, illustrates the law of refraction. However, whereas the development of FIG. 1 was begun by assuming that the incident light waves arrived at a selected angle I, FIG. 2 is used to determine the range of incident angles over which light will be refracted into the liquid oxygen and gaseous oxygen from the plastic level gage. Line AB represents the interface between the plastic at the left and oxygen (both liquid and gaseous) at the right. The line $b$ is normal to the interface intersecting it at point $x$. We shall consider only wave-fronts of light which contain particles of light which will arrive at the interface at points $x$ and $d$ and at the critical angle. Utilizing the definitions developed in connection with FIG. 1, let the distance $xd_1$, or the radius of arc V-gas, represent the velocity of light in oxygen gas. The arc V-plastic$_1$, drawn about point $d_1$, represents the locus of possible positions of that particle as it moves toward the point $d_1$ at the time when the other particle is at $x$.

The wave-front $xy$ of the wave arriving at the critical angle (for the refracting into gas) is drawn as the tangent to arc V-plastic$_1$ which extends through point $x$. Perpendicular to this wave-front, line K defines its direction and the critical angle of incidence designated in the drawing by the symbol I-Critical Gas.

Similarly to find the critical angle I-critical liquid when the refracting medium is liquid oxygen, the arc V-plastic$_2$ is drawn about point $d_2$ where the distance $xd_2$ is 0.82 times distance $xd_1$. The wave-front $xz$, at critical angle, is drawn tangent to the V-plastic$_2$ arc. The direction and angle are defined by the perpendicular line L.

Figure 3:
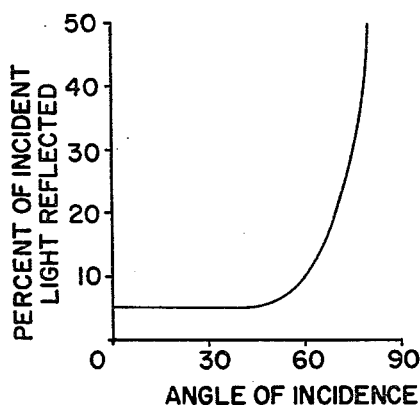
FIG. 3 is a graph of the relation of percent of light reflected from an interface with a refracting medium to the angle of light incidence on the interface.

Angle I-critical gas is found to be substantially 42.5 degrees and Angle I-critical liquid is substantially 55.5 degrees. Accordingly, light in the plastic directed toward its surface at an incidence angle between 42.5 and 55.5 degrees will be reflected if the refraction medium is gaseous oxygen but refracted if the refraction medium is liquid. Both of these critical angles, and the usable angle between them, will increase as the velocity of light in the plastic is increased until the velocity of light in the plastic equals or exceeds its velocity in the liquid. Accordingly, it would appear that the range of usable angles could be made maximum by selecting a material for the gage in which light velocity approaches its velocity in the liquid to be gaged. However, refraction is never complete. Some of the light is reflected and the amount reflected increases with the angle of incidence as shown in the chart of FIG. 3. Advantageously then, the gage material is selected so that the range of useful angles includes angles less than 60° from the normal to the interface. Advantageously, the light direction is controlled so that substantially all light strikes the interface at an incident angle less than 60° and within the range of useful angles.

It is another feature of the invention that light which has been reflected from the surface because the refraction medium was gas rather than liquid is prevented from subsequent refraction out of the gage whereby the quantity of light retained varies with liquid level.

The gage illustrated in FIG. 4 comprises a rectangular rod 10 of acrylic plastic fixed in a container 11 partially filled with a body of liquid oxygen 12. The volume above the liquid is filled with oxygen gas. A light source 14 is arranged above the container to direct light rays through a columnating lens 15 into the upper end of the gage.

The light traverses the gage as hereinafter described and emerges at a lateral enlargement at the upper end of the gage to impinge on a light quantity sensitive device such as the solar cell 16. The rear surface 18, the lower surface 20, and a portion of the front surface 22 of the gage 10 are made reflecting as by being coated with silver.

The gage 10 is shown in FIG. 5 along with light source 14, lens 15, and solar cell 16. The area 24 on the front surface 22 of the gage is an unsilvered window. Three light rays 50, 60, and 70 are shown to emanate from source 14 and, after columnation, to enter normally to the upper surface 26 of the gage at the near side, center, and far side of the gage, respectively. The three rays are shown by dashed lines to traverse the length of the gage, and they are three reflected upwardly by the silvered bottom surface 20 of the gage. Surface 20 is formed at an angle relatively to the parallel front and rear surfaces, 22 and 18, such that the light rays are reflected therefrom toward the front face 22 at an incident angle less than sixty degrees and within what has heretofore been called the useful angle. In the embodiment shown the angle is forty-five degrees.

In the absence of window 24 the three rays 50, 60, and 70 would be reflected back and forth between surfaces 18 and 22 until they all emerged from surface 28, as illustrated by rays 50 and 60.

Surface 28 is formed on the previously mentioned enlargement of the gage at its upper end at an angle perpendicular to the path of the upwardly reflected light rays. The rays pass through this surface and impinge upon the solar device 16. Window 24 comprises a narrow unsilvered area extending diagonally over the front face 22 of the gage. It extends over a distance (vertical distance in FIG. 5) which is at least as great as the range of levels to be gaged.

Each of rays 50, 60, and 70 would impinge three times on the front surface 22 in the absence of window 24, and each ray would impinge once on the area occupied by window 24.

Ray 70 impinges on this area 24 at a point below the gaseous oxygen-liquid oxygen interface whereby it is refracted into the liquid and does not reach or affect solar device 16. However, the first impingement of rays 50 and 60 is on a silvered area of surface 22 and they are reflected upward. At the second point of impingement of these rays on surface 22, ray 50 strikes a silvered area and so is reflected upwardly.

Ray 60 strikes the unsilvered area 24 but the point of impingement is above the gas-liqiud interface whereby this ray is also reflected upwardly. At the third impingement, ray 50 strikes window 24 at a point opposite gas and ray 60 strikes a silvered area so that both rays are directed upwardly and, of course, back to the silvered rear surface 18 from whence they are reflected toward surface 28 where they emerge to strike the solar device 16.

Only three rays are shown which, depending upon whether they reach the solar device, are capable of indicating the presence or absence of liquid at three levels. It will be obvious, when all light rays entering over the whole of surface 26 are considered, that the presence or absence of liquid at any level is indicated by the quantity of light reaching the solar device. The quantity of this light decreases as liquid level is raised. It will be obvious that the position of the light source and lens and the position of the solar device can be reversed. Light would then travel in an opposite direction along the paths shown but the effect and indication would remain unchanged. It will be equally obvious that the light source need only be located at the bottom of the unit if it was desired that light enter one end and leave the other. In that case the upper end enlargement could be omitted and the solar device 16 could be placed over the surface 26 to provide a simplified construction.

FIGURE 6 shows a gage 30 whose window 32 is shaped along its length whereby to provide a direct inverse relation between the quantity of light reaching the solar device and the volume of liquid in a spherical container. As shown, the window 32 increases in width toward the midpoint along its length whereby the change in the quantity of light lost for a given change in level is greatest for intermediate levels where volume change is also greatest.

I claim:
1. A liquid level gage comprising:
(a) an elongated element of light conducting material;
(b) said element having a surface and shape such that light rays introduced into the element at one end thereof traverse the length of the element, unless refracted therefrom, by successive reflections from impingement points on its surface;
(c) said surface comprising a first area from which light is substantially only reflected and a second area from which light is refracted at portions in contact with the liquid whose level is to be gaged and reflected at portions not in contact with said liquid;

(d) said second area having a boundary with said first area extending diagonally relative to the direction of said light paths and including only impingement points associated with said light paths that are at a different distance along the length of said element for each light path.

2. The invention defined in claim 1 which further comprises means for introducing such light rays into said one end of said element, and means for providing a signal variable with the quantity of light which traverses the length of said element by successive reflection from the surface of the element.

3. A liquid level gage comprising:
(a) a light conducting element having a shape and surface over a portion of its length such that light directed at transversely spaced initial points on the surface at one end of said portion traverses the interior of said portion along its length, unless refracted therefrom, by successive reflection from respectively corresponding transversely spaced points on said surface;
(b) said surface comprising first and second areas whose junction extends relative to said portion of the element and said transversely spaced points such that light directed at one of said initial points traverses a greater distance along said portion of the length of said element before impinging upon one of said first and second areas than does light directed at the other of said initial points;
(c) one of said first and second areas having the property of substantially only reflecting such light and the other having the property of refracting such light from portions thereof in contact with the material whose level is to be gaged and of reflecting such light from portions thereof not in contact with said material.

4. A liquid level gage comprising:
(a) an elongated member of light conducting material having, over the range of levels to be gaged, a first surface divided along a diagonal into a lower surface area which substantially only reflects light and an upper surface area at least the portion of which adjacent the diagonal refracts light when contacted by the liquid whose level is to be gaged and reflects light when not contacted by said liquid;
(b) said element having another surface parallel to said first surface from which light reflected thereto from said first surface is reflected back to said first surface;
(c) means for introducing light into said member and onto said first surface at one end thereof such that said light, unless refracted from the member, traverses said member in parallel paths, by successive reflection from said first and second surfaces, over the length of said range;
(d) and means sensitive to light for providing a signal variable with the quantity of light so traversing said member over the length of said range.

References Cited in the file of this patent
UNITED STATES PATENTS

| | | |
|---|---|---|
| 2,190,027 | Jordan | Feb. 13, 1940 |
| 2,240,988 | Hertel | May 6, 1941 |
| 2,350,712 | Barsties | June 6, 1944 |
| 2,596,897 | Haatvedt | May 13, 1952 |
| 2,620,660 | Goldsmith | Dec. 9, 1952 |

UNITED STATES PATENT OFFICE
CERTIFICATE OF CORRECTION

Patent No. 3,068,697

December 18, 1962

Morris William Carlson

It is hereby certified that error appears in the above numbered patent requiring correction and that the said Letters Patent should read as corrected below.

Column 1, line 70, the equation should appear as shown below instead of as in the patent:

$$\sin R = \frac{V\text{-leaving}}{V\text{-arriving}} \sin I$$

column 3, line 74, for "three" read -- there --.

Signed and sealed this 28th day of May 1963.

(SEAL)
Attest:

ERNEST W. SWIDER
Attesting Officer

DAVID L. LADD
Commissioner of Patents